US012064966B2

(12) United States Patent
Yonemoto

(10) Patent No.: US 12,064,966 B2
(45) Date of Patent: Aug. 20, 2024

(54) LIQUID EJECTION HEAD AND METHOD FOR MANUFACTURING THE SAME

(71) Applicant: CANON KABUSHIKI KAISHA, Tokyo (JP)

(72) Inventor: Taichi Yonemoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 18/152,917

(22) Filed: Jan. 11, 2023

(65) Prior Publication Data

US 2023/0147282 A1 May 11, 2023

Related U.S. Application Data

(62) Division of application No. 17/367,799, filed on Jul. 6, 2021, now Pat. No. 11,584,127.

(30) Foreign Application Priority Data

Jul. 31, 2020 (JP) ................................ 2020-130779

(51) Int. Cl.
*B41J 2/14* (2006.01)
*B41J 2/16* (2006.01)

(52) U.S. Cl.
CPC ......... *B41J 2/14145* (2013.01); *B41J 2/1601* (2013.01); *B41J 2/164* (2013.01)

(58) Field of Classification Search
CPC ...... B41J 2/14145; B41J 2/1601; B41J 2/164; B41J 2/1603; B41J 2/1623; B41J 2/1628;
(Continued)

(56) References Cited

U.S. PATENT DOCUMENTS 7,712,875 B2 5/2010 Shibata et al.
8,075,094 B2 12/2011 Shimomura et al.
(Continued)

FOREIGN PATENT DOCUMENTS

JP 61-83106 4/1986
JP 5-312153 A 11/1993
(Continued)

OTHER PUBLICATIONS

Kitawada Kiyobumi, Nozzle Plate, Manufacturing Apparatus for Nozzle Plate, Manufacturing Method for Nozzle Plate, Liquid Injection Head, and Liquid Injection Device (JP 2018051767 A), Apr. 5, 2018, Description of Embodiments, [Paragraphs 0002-0009] (Year: 2018).*

(Continued)

*Primary Examiner* — Lisa Solomon
(74) *Attorney, Agent, or Firm* — Venable LLP

(57) ABSTRACT

A liquid ejection head has at least a structure including an ejection orifice forming member having an ejection orifice for ejecting a liquid and a flow path communicating with the ejection orifice and a flow path forming substrate having a liquid introduction flow path communicating with the flow path and supplying the liquid, and includes: a first titanium oxide film with a pure water contact angle of 40° or less; and a second titanium oxide film with a pure water contact angle of 70° or more, wherein the first titanium oxide film covers the structure including inner walls of the flow path and the liquid introduction flow path and is exposed in the flow path and the liquid introduction flow path, and the second titanium oxide film has a portion covering the first titanium oxide film in a vicinity of an opening end.

20 Claims, 9 Drawing Sheets

(58) Field of Classification Search
CPC ...... B41J 2/1629; B41J 2/1631; B41J 2/1632; B41J 2/1634; B41J 2/1606
See application file for complete search history.

(56) References Cited

U.S. PATENT DOCUMENTS

| | | | |
|---|---|---|---|
| 10,669,628 | B2 | 6/2020 | Fukumoto et al. |
| 11,001,062 | B2 | 5/2021 | Teranishi et al. |
| 2006/0274113 | A1 | 12/2006 | Ono |
| 2021/0031524 | A1 | 2/2021 | Yonemoto |

FOREIGN PATENT DOCUMENTS

| | | | | |
|---|---|---|---|---|
| JP | 9-11478 | A | | 1/1997 |
| JP | 10-323979 | A | | 12/1998 |
| JP | 2007-290359 | A | | 11/2007 |
| JP | 2010-036580 | A | | 2/2010 |
| JP | 2012-192720 | A | | 10/2012 |
| JP | 2018-51767 | A | | 4/2018 |
| JP | 2018051767 | A | * | 4/2018 |
| JP | 2018-187789 | A | | 11/2018 |
| JP | 2020-062809 | A | | 4/2020 |
| JP | 2020-97129 | A | | 6/2020 |

OTHER PUBLICATIONS

Notice of Reasons for Refusal in Japanese Application No. 2020-130779 (Mar. 2024).

* cited by examiner

LIQUID EJECTION HEAD AND METHOD FOR MANUFACTURING THE SAME

CROSS-REFERENCE TO RELATED APPLICATIONS

This application is a divisional application of U.S. patent application Ser. No. 17/367,799, filed Jul. 6, 2021, which claims the benefit of Japanese Patent Application No. 2020-130779, filed Jul. 31, 2020. Both prior applications are hereby incorporated by reference herein in their entirety.

BACKGROUND OF THE INVENTION

Field of the Invention

The present disclosure relates to a liquid ejection head that ejects a liquid from an ejection orifice and a method for manufacturing the same.

Description of the Related Art

As an example of a liquid ejection head, an ink jet recording head that applies a pressure to an ink and causes the ink to be ejected as liquid droplets from an ejection orifice is exemplified. For products that handle various liquids such as pigment-based liquids and dye-based liquids as liquids to be ejected, such as an ink jet recording head, there may be cases in which a water repellent treatment or a hydrophilizing treatment is performed on surfaces that come into contact with the liquids, and a technique for appropriately using the treatments is important.

In an ink jet recording head, an energy generating element that provides energy for ejecting an ink is provided on a substrate, an ejection orifice forming member is formed on a surface of the substrate, and a plurality of ejection orifices for ejecting the ink is opened in the ejection orifice forming member.

Also, a silicon substrate is typically used as the substrate, and a through-hole as a flow path of the ink is formed in the silicon substrate. The ink is supplied from the back surface side toward the front surface side of the substrate through the through-hole. The through-hole and the ejection orifices communicate with each other, and the ink passing through the through-hole is ejected from the ejection orifice due to a pressure provided from the energy generating element. As the energy generating element, an element that can boil an ink through energization heating, such as a heater element, and an element that can apply a pressure to a liquid using a volume change, such as a piezoelectric element, are exemplified.

In such an ink jet recording head, there may be a case in which silicon in the silicon substrate is eluted by the ink and the silicon substrate is eroded. For example, Japanese Patent Application Laid-Open No. H09-11478 describes that a through-hole is protected with a protective film formed of an inorganic oxide (such as $SiO_2$) or metal (such as Ta) in order to avoid elution of silicon due to an alkali-containing ink.

On the other hand, Japanese Patent Application Laid-Open No. H05-312153, for example, discloses that a hydrophilic monomer is surface-graft-polymerized in order to prevent air bubbles from being generated in a flow path of a micropump as a technique for treating a surface. Also, Japanese Patent Application Laid-Open No. S61-83106 discloses that a titanium oxide layer caused to carry platinum is formed on one surface of a test piece of transparent quartz glass in order to prevent contamination of a solid surface that comes into contact with water.

However, there is a problem that in a case in which the surface inside the through-hole in the liquid ejection head is water repellent, air bubbles remain inside the through-hole when a liquid such as an ink flows therein. Even if a cleaning operation of causing the liquid inside the liquid ejection head to be discharged is performed, it is difficult to discharge the adhering air bubbles. In such a case, since the air bubbles grow, increase in size, and are discharged along with the liquid, it may not be possible to control a timing at which the air bubbles are discharged, and liquid ejection properties may be degraded.

On the other hand, if an extra hydrophilic protective film is formed from the vicinity of the openings of the ejection orifices to a pressure chamber in a case in which the hydrophilic protective film is formed, it is difficult to maintain a meniscus at a boundary between the ejection orifices and the surface where the openings of the ejection orifices are provided (the surface of the ejection orifice forming member). As a result, the liquid ejection properties may become unstable.

Also, in a case in which a hydrophilic protective film is formed on the surface inside the through-hole, there is a problem that an adhesive used to connect the liquid ejection head to a mounting member may crawl up to the inside of the through-hole along the protective film and liquid supply may be inhibited.

All these problems may affect ejection performance and may degrade printing quality.

Thus, an object of the present disclosure is to provide a liquid ejection head that can efficiently protect a substrate from a liquid, stably eject the liquid, and achieve long lifetime and high image quality.

SUMMARY OF THE INVENTION

According to an aspect of the present disclosure, there is provided a liquid ejection head that has at least a structure including an ejection orifice forming member and a flow path forming substrate, the ejection orifice forming member having an ejection orifice for ejecting a liquid and a flow path communicating with the ejection orifice, the flow path forming substrate having a liquid introduction flow path communicating with the flow path and supplying the liquid, the liquid ejection head including: a first titanium oxide film with a pure water contact angle of 40° or less; and a second titanium oxide film with a pure water contact angle of 70° or more, in which the first titanium oxide film covers the structure including inner walls of the flow path and the liquid introduction flow path and is exposed in the flow path and the liquid introduction flow path, and the second titanium oxide film has a portion that covers the first titanium oxide film at least either in a vicinity of an opening end of the ejection orifice of the ejection orifice forming member or in a vicinity of an opening end of the liquid introduction flow path in the flow path forming substrate.

According to another aspect of the present disclosure, there is provided a method for manufacturing a liquid ejection head that has at least a structure including an ejection orifice forming member and a flow path forming substrate, the ejection orifice forming member having an ejection orifice for ejecting a liquid and a flow path communicating with the ejection orifice, the flow path forming substrate having a liquid introduction flow path communicating with the flow path and supplying the liquid, the method including: forming a first titanium oxide film with a pure water contact angle of 40° or less by an atomic layer deposition method to cover the structure including inner walls of the flow path and the liquid introduction flow path; forming a second titanium oxide film with a pure water contact angle of 70° or more on the first titanium oxide film by the atomic layer deposition method; and patterning the second titanium oxide film to cause the first titanium oxide film to be exposed to at least inside the flow path and the liquid introduction flow path.

Further features of the present disclosure will become apparent from the following description of exemplary embodiments with reference to the attached drawings.

DESCRIPTION OF THE EMBODIMENTS

A liquid ejection head and a method for manufacturing the same according to the present disclosure will be described by exemplifying embodiments.

In an embodiment of the present disclosure, a water-repellent film and a hydrophilic film are appropriately used on a surface of a structure including the inside (inner wall) of a flow path of a liquid ejection head such as the inside of a flow path, the vicinity of an opening at a bonded portion with a mounting member (for example, a chip bonding plate), and the vicinity of an opening of an ejection orifice. It is thus possible to provide a liquid ejection head that solves the aforementioned problems. In the present embodiment, at least the inside of the flow path is covered with a hydrophilic film, the hydrophilic film is caused to be exposed inside the flow path, and a specific portion of the hydrophilic film is covered with a water-repellent film. The water-repellent film covers the hydrophilic film at a portion at least either in the vicinity of an opening end of an ejection orifice of an ejection orifice forming member or in the vicinity of an opening end of a liquid introduction flow path in a flow path forming substrate. In Embodiment 1, the hydrophilic film in the surroundings of the ejection orifice as the specific portion is covered with the water-repellent film. In Embodiment 2, the hydrophilic film in the vicinity of the opening end inside the liquid introduction flow path from the surroundings of a flow path opening in a back surface (on a liquid introduction side) of the flow path forming substrate at the specific part is covered with the water-repellent film.

Embodiment 1

Hereinafter, a liquid ejection head according to an embodiment of the present disclosure will be described using drawings.

Figure 1:
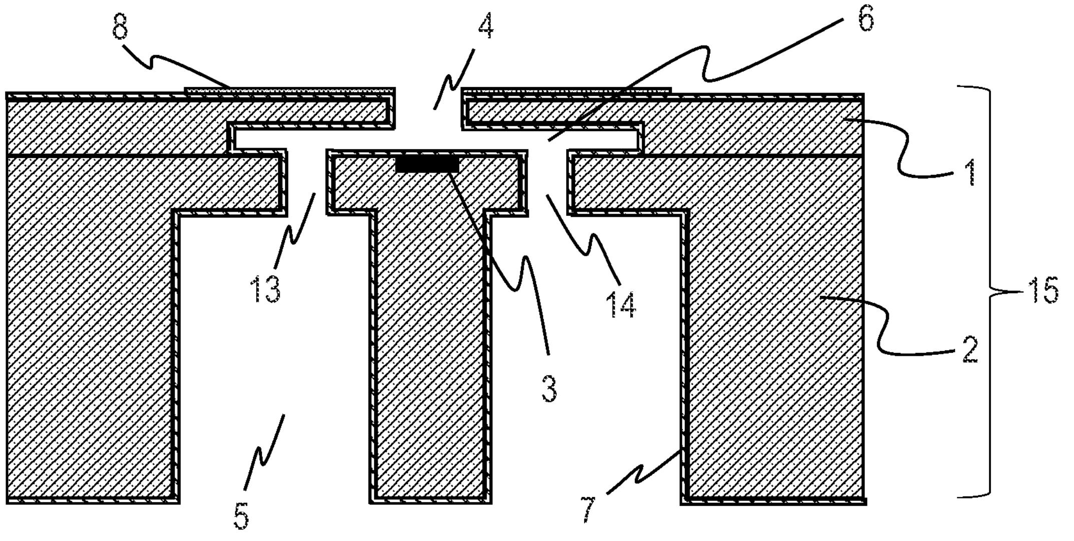
FIG. 1 is a schematic sectional view of a liquid ejection head according to Embodiment 1 of the present disclosure.

FIG. 1 is a schematic sectional view (side view) of the liquid ejection head according to Embodiment 1 of the present disclosure. As illustrated in FIG. 1, the liquid ejection head (for example, an ink jet recording head) has at least a flow path forming substrate 2 that has energy generating elements 3 and liquid introduction flow paths 5 and an ejection orifice forming member 1 disposed on the flow path forming substrate 2. The ejection orifice forming member 1 has ejection orifices 4 from which a liquid is ejected and a flow path including a pressure chamber 6 that communicates with the ejection orifices 4. The liquid introduction flow paths 5 communicate with the flow path via individual communication holes 13 and 14. A configuration part (structure) including the ejection orifice forming member 1 and the flow path forming substrate 2 will be referred to as a through-hole substrate 15. Through-holes are formed with the liquid introduction flow paths 5 via the individual communication holes 13 and 14 from the flow path including a liquid chamber communicating with the ejection orifices 4.

In the present embodiment, a surface of the through-hole substrate 15 including inner surfaces of the liquid introduction flow paths 5 is covered with a hydrophilic titanium oxide film (first titanium oxide film) 7. Also, the inner surface of the flow path including the pressure chamber 6 of the ejection orifice forming member 1 is also covered with the hydrophilic titanium oxide film (first titanium oxide film) 7.

Moreover, the surroundings of the ejection orifices on the outer surface of the ejection orifice forming member 1 where the ejection orifices 4 are formed is covered with a water-repellent titanium oxide film 8 (second titanium oxide film). In other words, the liquid ejection head in the present embodiment has the water-repellent titanium oxide film 8 that covers the vicinity of opening ends of the ejection orifices to surround the ejection orifices 4. The water-repellent titanium oxide film 8 is pattern-formed on the hydrophilic titanium oxide film 7.

With this configuration, it is possible to curb occurrence of bubble pools inside the flow path, which occurs when the liquid flows in, since the hydrophilic titanium oxide film 7 protects the inside of the flow path and also exhibits hydrophilicity. Also, the surface of the ejection orifice forming member in the surroundings of the ejection orifices is brought into a state in which it exhibits water repellency due to the water-repellent titanium oxide film 8 formed in the surroundings of the ejection orifices 4, meniscus is more likely to be formed at the ejection orifices, and liquid ejection properties can be stabilized (improvement in image quality).

The flow path forming substrate 2 includes the energy generating elements 3 formed on the upper surface of the substrate within a region corresponding to the pressure chamber 6. It is possible to cause liquid droplets to be ejected from the ejection orifices 4 by applying a pressure generated by the energy generating elements 3 to the liquid, with which the pressure chamber 6 is filled from the liquid introduction flow path 5 through the individual communication holes 13 and 14.

The energy generating elements 3 are not particularly limited, and for example, electrothermal conversion elements (a heat generating resistor element and a heater element) adapted to boil a liquid, elements (a piezo element, a piezoelectric element) adapted to apply a pressure to a liquid through a volume change or vibration, and the like can be used. The number and the disposition of the energy generating elements can be appropriately selected in accordance with the structure of the liquid ejection head to be produced. For example, it is possible to provide an element array, in which a plurality of energy generating elements are aligned at predetermined pitches, at a center between a pair of liquid introduction flow paths 5 (a form in which the liquid is supplied to the elements at the center from the liquid introduction flow path 5 on both sides: the form illustrated in FIG. 1). Alternatively, it is possible to provide element arrays, in which a plurality of energy generating elements are aligned at predetermined pitches, on both sides of the liquid introduction flow path 5 (a form in which the liquid is supplied to the elements on both sides from the liquid introduction flow path at the center: the disposition described in Japanese Patent Application Laid-Open No. 2020-62809, for example).

The liquid introduction flow paths 5 having openings on the back surface side (the side on which the liquid is supplied) is formed on the flow path forming substrate 2. The liquid introduction flow paths 5 are connected to the pressure chamber 6 through the individual communication holes 13 and 14 on the front side (the side on which the ejection orifice forming member 1 is formed) of the flow path forming substrate 2.

The shape of openings of the liquid introduction flow paths 5 on the side on which the liquid is supplied can be a rectangular shape, for example, and the corners thereof may be rounded or chamfered.

Although the shape of the liquid introduction flow paths 5 may be a groove shape having wall surfaces that are perpendicular to the surface (plane) of the substrate as illustrated in FIG. 1, the shape may be a tapered shape with an opening area decreasing from the liquid introduction side to the opposite side.

The liquid introduction flow paths 5 can be formed using anisotropic etching, for example. In a case in which a single crystal silicon substrate is used as the substrate for forming the flow path forming substrate 2, for example, the liquid introduction flow paths 5 can be formed by performing anisotropic etching using an alkali solution using a patterned silicon oxide film as a mask. Since etching advances along a crystal surface of silicon in the anisotropic etching, a substantially rectangular opening shape is obtained. It is also possible to use a substrate with holes formed in advance with a laser. In addition, it is possible to form perpendicular grooves through reactive ion etching based on a Bosch process in which etching and passivation are repeated as in an example described later.

The substrate with the energy generating elements 3 formed thereon can have a protective film (not illustrated) that protects the energy generating elements 3 from the liquid, a drive circuit (not illustrated) for driving the energy generating elements 3, and the like.

The ejection orifice forming member 1 has the ejection orifices 4 and the pressure chamber 6 that communicates with the ejection orifices 4. The ejection orifices 4 are openings for ejecting the liquid and are formed at portions above the energy generating elements 3. The number and the disposition of the ejection orifices can be appropriately set, and in the liquid ejection head illustrated in FIG. 1, the ejection orifices can be disposed at equal intervals along the lengthwise direction (the depth direction from the closest side of the drawing) of the liquid ejection head. The ejection orifice array in which the ejection orifices are aligned is disposed between the pair of liquid introduction flow paths 5.

The pressure chamber 6 is a space surrounded by the ejection orifice forming member 1 and the flow path forming substrate 2 and serves as a flow path connected to the liquid introduction flow path 5. The liquid is supplied from the liquid introduction flow path 5 to the pressure chamber 6 via the individual communication holes 13 and 14 in the flow path forming substrate 2.

An ejection orifice substrate in which a flow path including ejection orifices and a liquid chamber are formed can be used as the ejection orifice forming member 1, and this can be joined to the flow path forming substrate 2. The ejection orifice forming member 1 may be configured with a plurality of layers including an orifice plate having ejection orifices and a flow path wall member having a flow path. Alternatively, the ejection orifice forming member 1 can be formed by a photolithography technique using a photosensitive resin material. An adhesive resin layer (not illustrated) of a polyamide resin, for example, may be provided between the ejection orifice forming member 1 and the flow path forming substrate 2 in order to enhance adhesiveness.

In the liquid ejection head with the structure described above, the hydrophilic titanium oxide film 7 and the water-repellent titanium oxide film 8 are formed in a laminated manner.

In the present embodiment, the surface of the through-hole substrate 15 (configuration member) including the inner surfaces of the flow path including the pressure chamber 6 and the liquid introduction flow paths 5 is covered with the hydrophilic titanium oxide film 7 (first titanium oxide film) as illustrated in FIG. 1. The water-repellent titanium oxide film 8 (second titanium oxide film) is formed on the hydrophilic titanium oxide film 7 to cover the surroundings of the ejection orifices 4 (to surround the surroundings along the opening ends). In other words, the liquid ejection head according to the present embodiment has, on the outer surface of the ejection orifice forming member 1 where the ejection orifices 4 are formed, the water-repellent titanium oxide film 8 that covers the vicinity of the opening ends of the ejection orifices to surround the ejection orifices.

The hydrophilic titanium oxide film 7 protects the configuration member from the liquid such as an ink (extension of a lifetime), can reduce remaining of air bubbles inside the flow path, and can prevent the liquid ejection properties from being degraded (improvement in image quality).

Also, the water-repellent titanium oxide film 8 promotes formation of meniscus at the ejection orifices and can stabilize the liquid ejection properties (improvement in image quality).

The water-repellent titanium oxide film (second titanium oxide film) preferably covers at a portion with a distance (corresponding to the length of the water-repellent titanium oxide film 8 in the transverse direction in FIG. 1) of at least 8 μm from the opening ends of the ejection orifices on the outer surface of the ejection orifice forming member, as the vicinity of the opening ends to be covered. In the specification, this portion will be referred to as the vicinity of the opening ends of the ejection orifices. Although the entire outer surface of the ejection orifice forming member may be covered, the hydrophilic titanium oxide film (first titanium oxide film) is preferably exposed outside the vicinity of the opening ends. In this manner, the liquid adhering to the vicinity of the opening ends of the ejection orifices during liquid ejection is actively discharged to the outside hydrophilic portion, and it is possible to curb adhesion of the liquid near the ejection orifices and to reduce printing distortion.

The first titanium oxide film (hydrophilic titanium oxide film 7) preferably has hydrophilicity with a pure water contact angle of 40° or less. The second titanium oxide film (water-repellent titanium oxide film 8) preferably has water repellency with a pure water contact angle of 70° or more. The pure water contact angles in the present disclosure are static contact angle with respect to pure water measured by a static drip method in accordance with JIS R 3257.

Such titanium oxide films with different contact angles can be formed by controlling film formation temperature conditions by an atomic layer deposition (ALD) method. It is possible to enhance hydrophilicity of the titanium oxide film by raising the film formation temperature, and on the contrary, it is possible to lower hydrophilicity (that is, to enhance water repellency) of the titanium oxide film by lowering the film formation temperature. The hydrophilic titanium oxide film (first titanium oxide film), particularly, the titanium oxide film having hydrophilicity with a pure water contact angle of 40° or less is preferably formed within a range of 290 to 310° C. The water-repellent titanium oxide film (second titanium oxide film), particularly, the titanium oxide film with water repellency with a pure water contact angle of 70° or more is preferably formed within a range of 65 to 85° C.

The first titanium oxide film (hydrophilic titanium oxide film 7) in the present embodiment is preferably a titanium oxide film that exhibits hydrophilicity and is formed using $TiCl_4$ and pure water as raw materials within a range of 290 to 310° C. Also, the second titanium oxide film (water-repellent titanium oxide film 8) is preferably a titanium oxide film that exhibits water repellency and is formed using $TiCl_4$ and pure water as raw materials within a range of 65 to 85° C. It is also possible to form the first and second titanium oxide films using tetrakis (dimethylamino) titanium (TDMAT) and pure water.

Figure 6A:
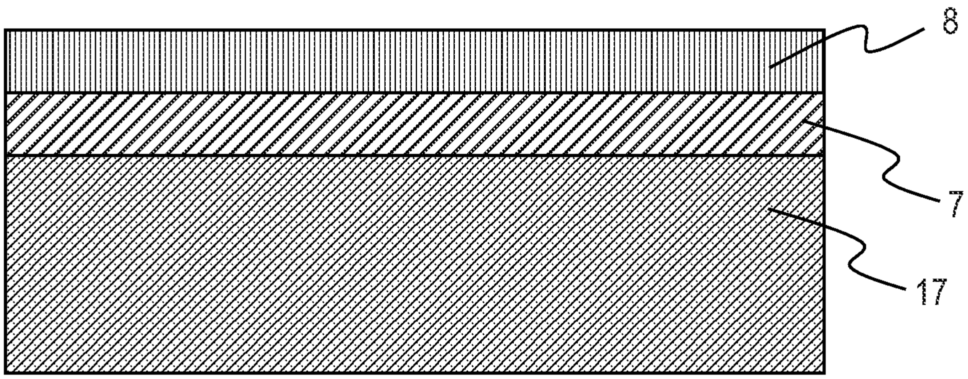
FIG. 6A is a schematic partially enlarged sectional view for describing a laminated configuration of titanium oxide films in a liquid ejection head according to an embodiment of the present disclosure.
Figure 6B:
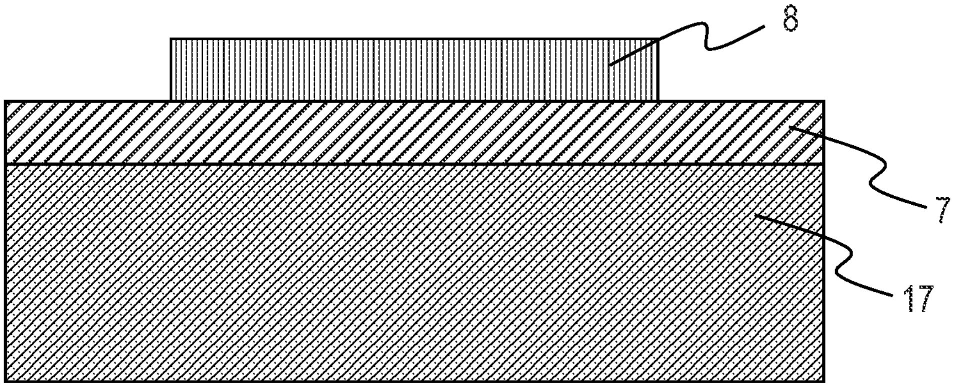
FIG. 6B is a schematic partially enlarged sectional view for describing the laminated configuration of the titanium oxide films in the liquid ejection head according to the embodiment of the present disclosure.

FIGS. 6A and 6B are schematic partially enlarged sectional views for describing a laminated configuration of titanium oxide films in the liquid ejection head according to the present embodiment. Hereinafter, the titanium oxide films and a method for forming the same in the liquid ejection head according to the present embodiment will be further described.

For the titanium oxide films in the present embodiment, it is possible to use titanium oxide films (ALD-TiO films) formed using titanium tetrachloride ($TiCl_4$) and pure water by an atomic layer deposition method (ALD method). It is possible to form the films by $TiCl_4$ and pure water being alternately supplied. At this time, degrees of water repellency and hydrophilicity of the obtained titanium oxide films change depending on the film formation temperature of the titanium oxide films. Table 1 illustrates a relationship between the film formation temperature and a contact angle (a contact angle [° ] with respect to pure water) of the titanium oxide films. The film formation was carried out three times under the same conditions for the film formation temperatures 75° C. and 300° C., and contact angles of the obtained titanium oxide films with respect to pure water were measured. As the measurement of the contact angles with respect to pure water, measurement of static contact angles based on the static drip method in accordance with JIS R 3257 was carried out.

TABLE 1

| | Film formation at 75° C. | Film formation at 300° C. |
|---|---|---|
| First time | 77.33° | 25.4° |
| Second time | 78.48° | 24.9° |
| Third time | 78.37° | 18.6° |
| Ave | 78.1° | 23.0° |

As illustrated in the table, the contact angles of the titanium oxide film formed at 300° C. had an average value (Ave) of 23.0 and decreased to about 20°. On the other hand, the contact angles of the titanium oxide film formed at 75° had an average value (Ave) of 78.1° and increased to about 80°. It is possible to ascertain from this that the titanium oxide film formed at a high film formation temperature around 300° C. has a small contact angle while the titanium oxide film formed at a low film formation temperature around 75° C. has a large contact angle.

In order to address the problem that air bubbles generated when the liquid flows in remains in the flow path, it is preferable to form a titanium oxide film in which a contact angle of the flow path inner surface with respect to pure water is 40° or less. The pure water contact angle of the titanium oxide film is more preferably 35° or less and is further preferably 30° or less. It is possible to sufficiently curb remaining of air bubbles by forming such a titanium oxide film with a small pure water contact angle in the flow path.

In order to address the problem that the liquid ejection properties become unstable and the problem that the adhesive used to join the liquid ejection head to the mounting member crawls up to the inside of the liquid introduction flow path, it is preferable to form a titanium oxide film in which the contact angle of the flow path inner surface with respect to pure water is 70° or more. The pure water contact angle of the titanium oxide film is more preferably 75° or more. It is possible to stabilize the liquid ejection properties by forming such a titanium oxide film with a large contact angle in the vicinity of the opening ends of the ejection orifices. Also, it is possible to curb entrance of the adhesive into the liquid introduction flow paths by forming such a titanium oxide film with a large pure water contact angle in the vicinity of the opening ends of the liquid introduction flow paths.

In terms of acquisition of water repellency, the thickness of the first titanium oxide film (hydrophilic titanium oxide film 7) is preferably 30 nm or more, and the thickness of the second titanium oxide film (water-repellent titanium oxide film 8) is preferably 30 nm or more. The thickness of the laminated films of the first titanium oxide film and the second titanium oxide film is preferably 60 nm or more. Also, since the films are likely to peel off if the film thickness exceeds 300 nm, the thickness of each of the first titanium oxide film and the second titanium oxide film is preferably 300 nm or less.

In the present embodiment, a difference between the contact angles of the titanium oxide films caused by the difference in film formation temperature in the film formation based on the atomic layer deposition method is used. It is thus possible to form the titanium oxide films in a two-layer configuration and to form a laminated structure in which films with the same composition and with different contact angles are laminated.

In a method for manufacturing the liquid ejection head having such a laminated structure of titanium oxide films, the first titanium oxide film with a pure water contact angle of 40° or less is formed first to cover a structure (a configuration part including the ejection orifice forming member 1 and the flow path forming substrate 2) including an inner wall of the flow path by the atomic layer deposition method. The first titanium oxide film is formed to cover the inner walls of the flow paths of the structure, that is, the inner walls of the flow path of the ejection orifice forming member 1 and the liquid introduction flow paths 5 in the flow path forming substrate 2. Next, the second titanium oxide film with a pure water contact angle of 70° or more is formed on the first titanium oxide film by the atomic layer deposition method.

Then, the second titanium oxide film is patterned to cause the first titanium oxide film to be exposed at least inside the flow path. At this time, the patterning of the second titanium oxide film is performed such that the portion of the second titanium oxide film covering the first titanium oxide film is left at least either in the vicinity of the opening ends of the ejection orifices in the ejection orifice forming member or in the vicinity of the opening ends of the liquid introduction flow paths in the flow path forming substrate. In Embodiment 1, the patterning of the second titanium oxide film is performed such that the portion covering the first titanium oxide film is left in the vicinity of the opening end of the ejection orifices in the ejection orifice forming member. In Embodiment 2, which will be described later, the patterning of the second titanium oxide film is performed such that a part covering the first titanium oxide film is left in the vicinity of the opening ends of the liquid introduction flow paths in the flow path forming substrate.

For example, it is possible to form the laminated structure by forming the hydrophilic titanium oxide film 7 on the silicon substrate 17 (the ejection orifice forming member 1 or the flow path forming substrate 2) and forming the water-repellent titanium oxide film 8 on the hydrophilic titanium oxide film 7 as illustrated in FIG. 6A. Thereafter, the water-repellent film is left at a portion that requires the water-repellent film, and a configuration where the hydrophilic film is exposed is formed at a portion to be hydrophilic as illustrated in FIG. 6B.

At this time, it is possible to selectively remove (pattern) a portion (unnecessary portion) of the water-repellent film immediately above the portion to be hydrophilic through wet etching in order to cause the hydrophilic film to be exposed at the portion to be hydrophilic. As an etching solution for removing the unnecessary portion of the water-repellent film (patterning the water-repellent film), a fluorine-based etching solution (an etching solution containing a hydrofluoric acid) can be used. When the water-repellent film is removed (patterned) with the fluorine-based etching solution, the etching rate of the hydrophilic film (first titanium oxide film) is preferably lower than the etching rate of the water-repellent film (second titanium oxide film) by 7.0 times or more.

Figure 9:
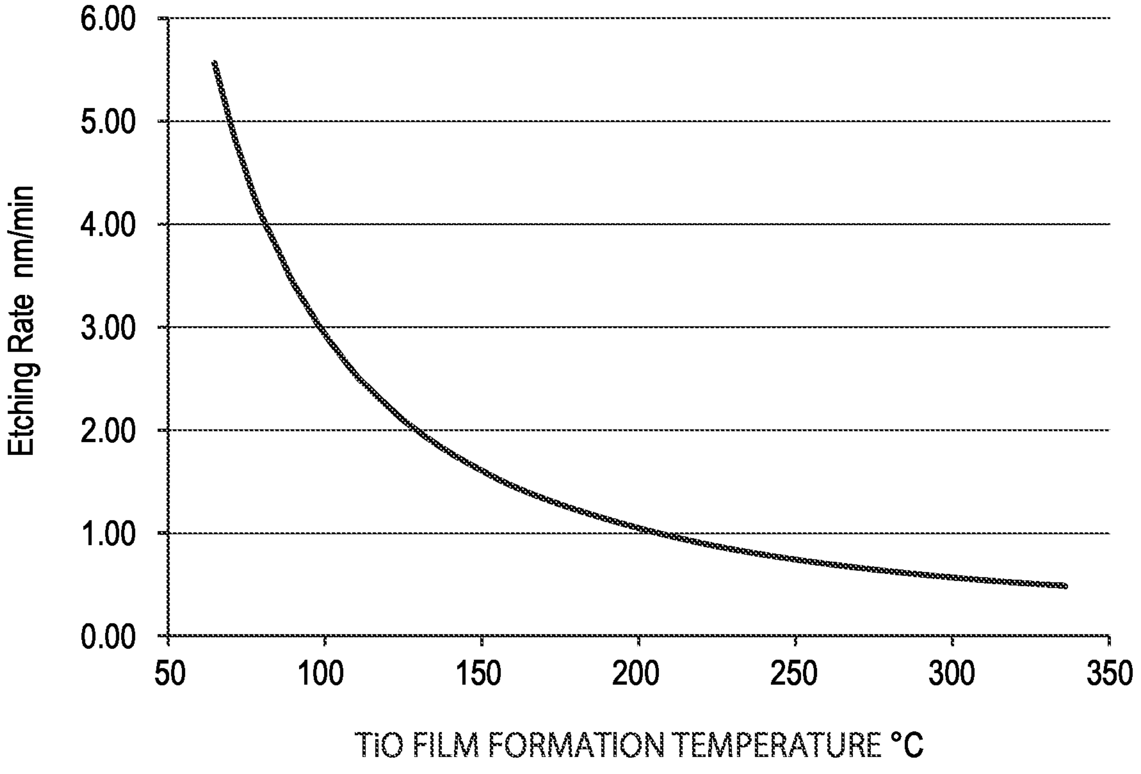
FIG. 9 is a graph illustrating a relationship between a film formation temperature of the titanium oxide film and an etching rate.

FIG. 9 illustrates a graph illustrating a relationship between the film formation temperature and the etching rate of the titanium oxide film in the wet etching using the etching solution containing a hydrofluoric acid. As can be recognized from the graph, the etching rate of the hydrophilic titanium oxide film formed at 300° C. is about 0.6 nm/min, and the etching rate of the water-repellent titanium oxide film formed at 75° C. is about 4.5 nm/min. Based on this, it is possible to obtain satisfactory protection properties and a patterned shape with the form in which the hydrophilic titanium oxide film is used as a lower layer and the water-repellent titanium oxide film is used in the upper layer.

Figure 7:
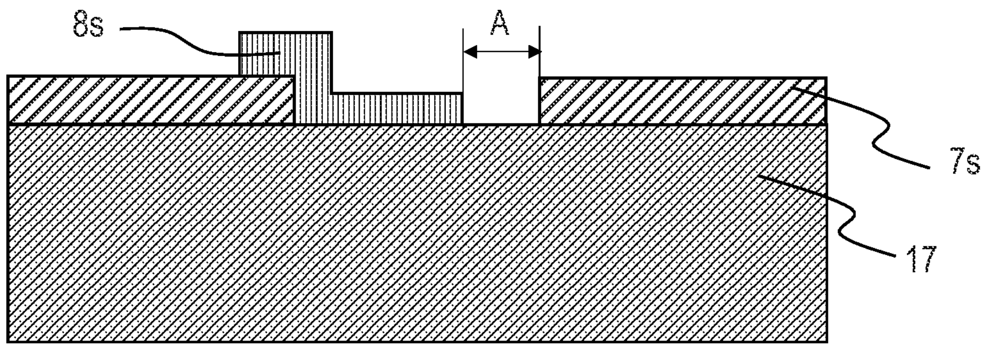
FIG. 7 is a schematic sectional view for describing a problem in a case in which two types of protective films with mutually different contact angles are formed in one layer.
Figure 8:
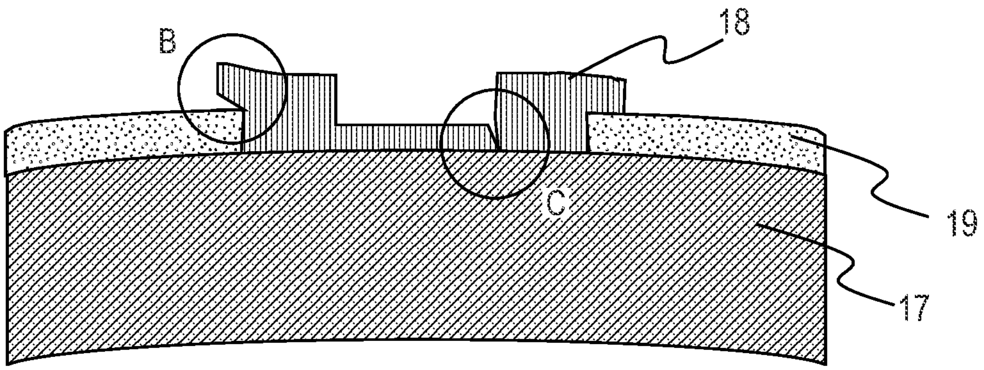
FIG. 8 is a schematic sectional view for describing a problem in a case in which two types of protective films with mutually different contact angles are formed in one layer.

FIGS. 7 and 8 illustrate schematic sectional views for describing a problem that two types of protective films with mutually different contact angles are formed in one layer. Although a laminated structure is formed by laminating two types of titanium oxide films with mutually different contact angles as described in the present embodiment, a problem that may occur in a case in which the two types of protective films with mutually different contact angles are formed as a single layer (single-layer structure) will be described. With the laminated structure in the present embodiment, it is possible to prevent the problem that may occur in the single-layer structure.

For example, in a case in which a hydrophilic protective film 7*s* is formed on the silicon substrate 17, patterning is performed such that an unnecessary hydrophilic part is removed with only a necessary hydrophilic part left, and the water-repellent protective film 8*s* is pattern-formed at the portion from which the hydrophilic portion has been removed as illustrated in FIG. 7, the next problem may occur. In other words, a clearance A may be generated at a boundary between the hydrophilic protective film and the water-repellent protective film depending on patterning precision, the surface of the substrate 17 may be exposed, and this may damage functions of the protective films.

Also, even in a case in which an overlapped part is provided at the boundary between the hydrophilic protective film and the water-repellent protective film in consideration of patterning precision, the surface of the substrate 17 may be exposed due to variations in etching rate, and the functions of the protective films may be damaged.

Also, in a case in which films of mutually different constituent elements or films made by mutually different film forming methods are formed as the water-repellent protective film and the hydrophilic protective film and the films are formed in a single layer, the following problem may occur. For example, FIG. 8 illustrates a case in which a lower layer is a compression film 19 having a stress working in a compression direction and an upper layer of the overlapped part is a tension film 18 having a stress working in a tensile direction. In such a case, peeling B or cracking C is likely to occur due to a difference in stress between the lower layer and the upper layer, and the protection properties may still be degraded.

If the laminated structure in which the hydrophilic titanium oxide film formed at a high temperature is disposed as the lower layer side and the water-repellent titanium oxide film formed at a low temperature is disposed as the upper layer is employed as in the present embodiment, the films with the same constituent element are formed, and the problems such as a difference in stress and an adhesion force are eliminated. Also, since degradation of reliability of the protective films due to a difference in chemical resistance does not occur, it is possible to secure the protection properties and to maintain the hydrophilic portion and the water-repellent portion.

Embodiment 2

Figure 2:
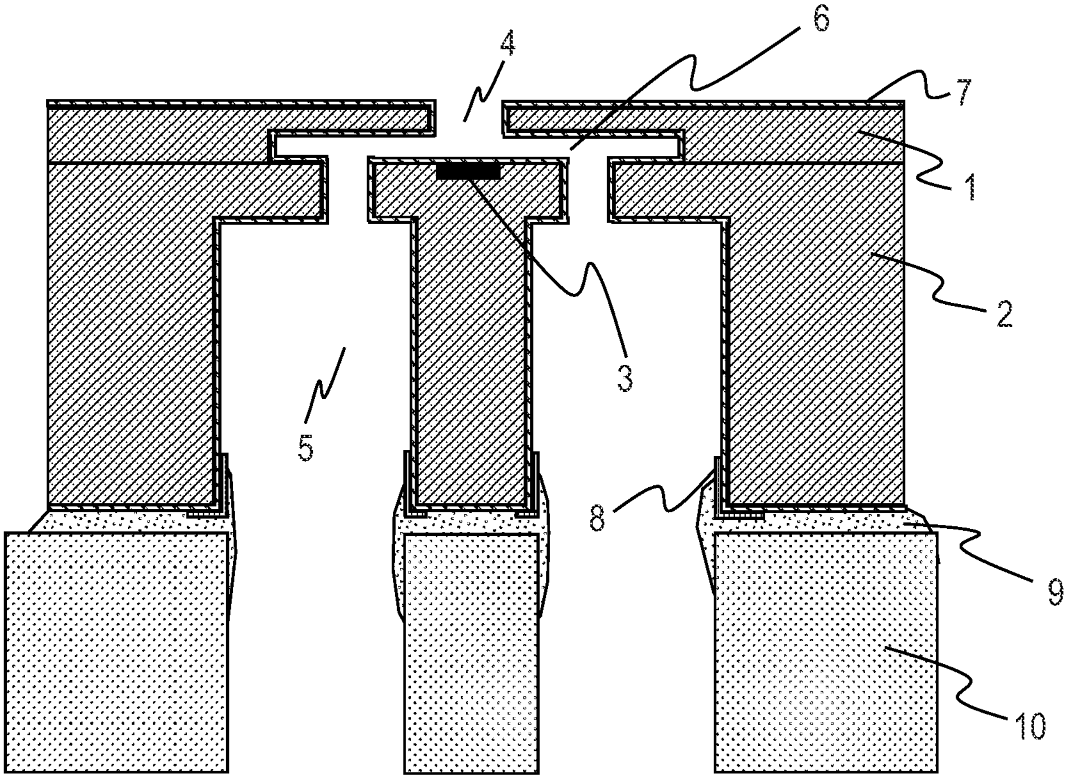
FIG. 2 is a schematic sectional view illustrating a state in which a liquid ejection head according to Embodiment 2 of the present disclosure is connected to a chip bonding plate.
Figure 3:
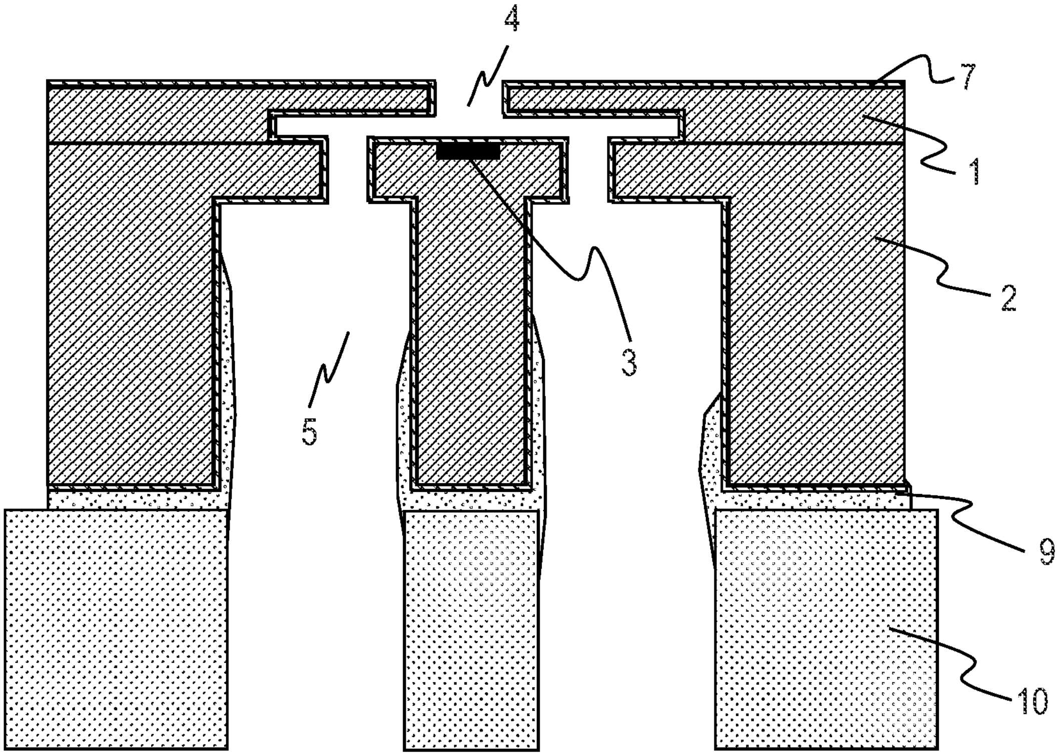
FIG. 3 is a schematic sectional view illustrating a state in which a liquid ejection head that does not have a water-repellent titanium oxide film is connected to a chip bonding plate.

FIG. 2 is a schematic sectional view illustrating a state in which a liquid ejection head according to Embodiment 2 of the present disclosure is connected to a chip bonding plate 11 (mounting member). FIG. 3 is a schematic sectional view illustrating a state in which a liquid ejection head with no water-repellent titanium oxide film 8 is connected to the chip bonding plate 11.

The liquid ejection head (in a state before bonding to the chip bonding plate 11) illustrated in FIG. 2 is formed such that the water-repellent titanium oxide film 8 is not formed in the surroundings of the ejection orifices 4, the opening ends are covered from the surroundings of the introduction-side openings of the liquid introduction flow paths 5, and the vicinity of the opening ends is further covered inside the liquid introduction flow paths. The other portions of the liquid ejection head illustrated in FIG. 2 have structures similar to those of the liquid ejection head according to Embodiment 1 illustrated in FIG. 1. The liquid ejection head according to the present embodiment has a water-repellent titanium oxide film that covers the vicinity of the opening ends on the outer surface of the flow path forming substrate where the introduction-side openings of the liquid introduction flow paths for introducing a liquid is formed to surround the introduction-side openings and further covers a vicinity of the opening ends in the liquid introduction flow paths from the opening ends. The water-repellent titanium oxide film 8 is successively formed over the inside of the openings from the outer surface and covers the opening ends.

On the other hand, since the liquid ejection head illustrated in FIG. 3 does not have the water-repellent titanium oxide film 8, the following problem may occur when the chip bonding plate 10 is attached with an adhesive 9. In other words, a phenomenon that the adhesive 9 irregularly crawls up to the inside of the flow path due to wettability of the flow path inner wall may occur as illustrated in FIG. 3, the width of the liquid introduction flow path 5 may be narrowed, the amount of liquid flowing in may decrease, and ejection performance may be degraded.

On the other hand, the liquid ejection head according to Embodiment 2 illustrated in FIG. 2 exhibits water repellency in the vicinity of the openings since the water-repellent titanium oxide film 8 is pattern-formed in the vicinity of the openings in the back surface of the flow path forming substrate 2. In this manner, wettability with respect to the adhesion decreases, and it is thus possible to reduce the amount of adhesive 9 crawling up. Also, since the inner surfaces of the liquid introduction flow paths are covered with the hydrophilic titanium oxide film 7, it is possible to curb occurrence of bubble pools when the liquid flows in.

The water-repellent titanium oxide film (second titanium oxide film) preferably covers a portion at a distance of 1 to 5 μm from the opening ends (corresponding to the length of the water-repellent titanium oxide film 8 in the longitudinal direction inside the liquid introduction flow paths 5 in FIG. 2), as the vicinity of the opening ends of the liquid introduction flow paths. In the specification, the portion will be referred to as the vicinity of the opening ends of the liquid introduction flow paths. In terms of curbing of air bubbles remaining in the flow paths, the covering portion of the water-repellent titanium oxide film in the flow paths is preferably as small as possible.

The water-repellent titanium oxide film (second titanium oxide film) preferably covers a portion at a distance of 1 to 5 μm from the opening ends (corresponding to the length of the water-repellent titanium oxide film 8 in the transverse direction outside the liquid introduction flow paths 5 in FIG. 2), as the vicinity of the opening ends of the liquid introduction flow paths in the outer surface of the flow path forming substrate. The water-repellent titanium oxide film more preferably covers a portion at 1.1 to 4.5 μm. In terms of wettability with respect to the adhesive used, the covering portion of the water-repellent titanium oxide film is preferably as small as possible in the outer surface (bonded surface) of the flow path forming substrate.

Other Embodiments

The water-repellent titanium oxide film 8 can cover the vicinity of the opening ends to surround the ejection orifices as in Embodiment 1, and also can cover the vicinity of the opening ends to surround the introduction-side openings of the liquid introduction flow paths and further cover the vicinity of the opening ends in the flow path from the vicinity of the opening ends as in Embodiment 2. In this manner, it is possible to further stabilize the liquid ejection properties (improve image quality) while protecting the inside of the flow path.

EXAMPLES

Example 1

Figure 4:
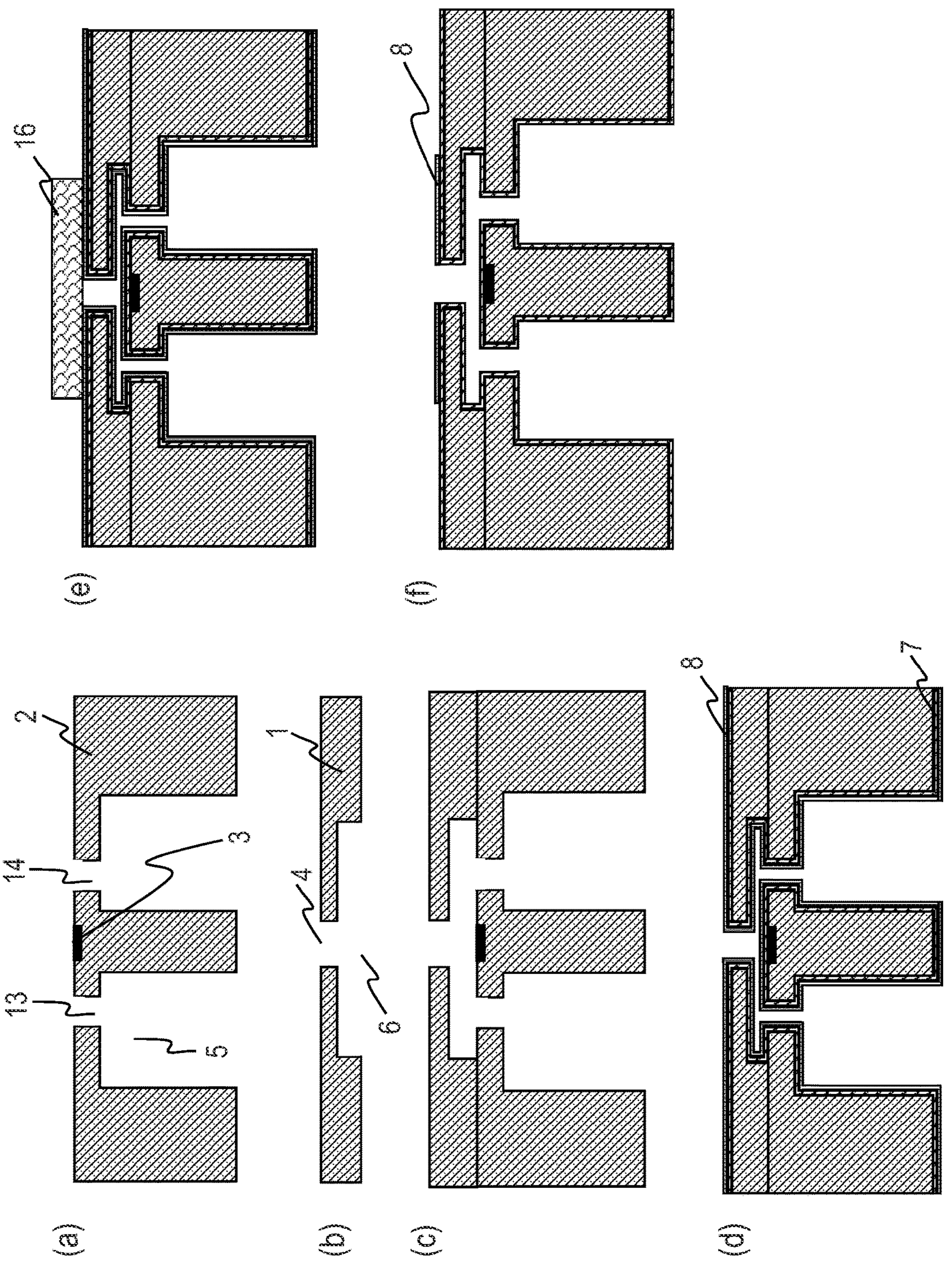
FIG. 4 is an overview process sectional view for describing an example of a method for manufacturing the liquid ejection head according to Embodiment 1 of the present disclosure.

The liquid ejection head according to Embodiment 1 of the present disclosure will be described using drawings on the basis of an example. FIG. 4 is an overview process sectional view for describing a manufacturing method according to the example.

First, a silicon substrate with the energy generating elements 3 and a drive circuit (not illustrated) formed thereon was prepared to form the flow path forming substrate 2.

Next, the liquid introduction flow path 5 and the individual communication holes 13 and 14 were formed in the silicon substrate as follows as illustrated in (a) of FIG. 4, thereby obtaining the flow path forming substrate 2.

First, a photosensitive positive resist was applied to the entire back surface of the silicon substrate. The applied positive resist was exposed with the exposure amount of 4800 $J/m^2$ through a pattern forming exposure mask for the liquid introduction flow paths 5, using a semiconductor exposure device. Next, development was performed using a 2.38% aqueous solution of tetramethylammonium hydroxide, thereby forming a liquid introduction flow path pattern (resin mask layer).

Next, the silicon substrate was etched to a predetermined position through reactive ion etching of a Bosch process capable of performing anisotropic etching by repeating etching and passivation alternately using $SF_6$ gas and $C_4F_8$ gas, thereby forming the liquid introduction flow paths 5.

Next, a patterned mask layer was formed from the front surface side of the silicon substrate by a method similar to that of the above process, and the individual communication holes 13 and 14 were formed by etching the silicon substrate, thereby obtaining the flow path forming substrate 2.

Next, the ejection orifice forming member 1 having the ejection orifices 4 and recessed portions configuring the pressure chamber 6 was formed as follows as illustrated in (b) of FIG. 4.

First, the recessed portion configuring the pressure chamber 6 was formed from the back surface at a predetermined position of the silicon substrate, and the ejection orifices 4 were then formed from the front surface of the substrate. The formation of the recessed portion configuring the pressure chamber 6 and the ejection orifices 4 was carried out by a process similar to the aforementioned formation process of the liquid introduction flow paths in the flow path forming substrate 2. At this time, the substrate thickness was adjusted through grinding and polishing based on chemical machine polishing (CMP).

Thereafter, the ejection orifice forming member 1 with the recessed portion configuring the pressure chamber 6 and the ejection orifices 4 formed therein was bonded to the flow path forming substrate 2 as illustrated in (c) of FIG. 4. In this manner, the pressure chamber 6 and the liquid introduction flow path 5 communicated with each other through the individual communication holes 13 and 14, and a liquid flowed in through the liquid introduction flow paths 5 and was then stored.

Next, the titanium oxide films (TiO films) 7 and 8 were formed using $TiCl_4$ and pure water by an atomic layer deposition method (ALD method) as follows as illustrated in (d) of FIG. 4. Specifically, the film formation was carried out by alternately supplying $TiCl_4$ and pure water. At this time, the film formation cycle was carried out as follows. First, gasified $TiCl_4$ and nitrogen were transported into a furnace together and were sprayed for 5 seconds, and purge with nitrogen and exhaust were then sufficiently performed. Next, gasified pure water and nitrogen were transported into a furnace together and were sprayed for 5 seconds, and purge with nitrogen and exhaust were then sufficiently performed. The same cycle was repeated about 1000 times on the assumption that the above cycle was counted as one cycle, and the hydrophilic titanium oxide film 7 was formed to have a thickness of 80 nm at a film formation temperature controlled at 300° C.±10° C. Moreover, the water-repellent titanium oxide film 8 was formed to have a thickness of 80 nm on the hydrophilic titanium oxide film 7 at a film formation temperature controlled at 75° C.±10° C. through the same film formation cycle as the aforementioned film formation cycle, thereby obtaining a laminated film including the hydrophilic titanium oxide film 7 and the water-repellent titanium oxide film 8.

Thereafter, the resin mask layer 16 was formed on the surface on the side on which the ejection orifices 4 were formed by a tenting method using a film as follows as illustrated in (e) of FIG. 4.

First, a photosensitive film was attached to the surface on the side on which the ejection orifices 4 were formed. Next, the exposure was carried out with an exposure amount of 4800 $J/m^2$ through a pattern forming exposure mask for the water-repellent titanium oxide film 8 using a semiconductor exposure device. Next, development was performed using a 2.38% aqueous solution of tetramethylammonium hydroxide, thereby forming the resin mask layer 16 covering the vicinity of the opening ends to surround the ejection orifices 4.

Next, the water-repellent titanium oxide film 8 covering the vicinity of the opening ends to surround the ejection orifices 4 was left, and the water-repellent titanium oxide film 8 at an unnecessary part was etched and removed, in a wet etching process using a fluorine-based etching solution (an etching solution containing a hydrofluoric acid). Thereafter, the resin mask layer 16 was removed, thereby obtaining a pattern for the water-repellent titanium oxide film 8 (a water-repellent titanium oxide film pattern covering the vicinity of the opening ends to surround the ejection orifices 4) ((f) of FIG. 4).

In the liquid ejection head obtained as described above, the inner surfaces of the liquid introduction flow paths 5 exhibited hydrophilicity due to the formed hydrophilic titanium oxide film 7, and the vicinity of the opening ends surrounding the ejection orifices 4 was in a state in which it exhibited water repellency due to the water-repellent titanium oxide film 8 formed on the surface on the side on which the ejection orifices 4 were formed.

With the configuration in which the inside of the flow path was covered with the hydrophilic titanium oxide film 7, it was possible to curb occurrence of bubble pools generated when the liquid flowed into the flow path. Also, since the surface of the substrate in the flow path configuring the flow path was protected with the titanium oxide films, a structure with excellent chemical resistance and water resistance was achieved. Moreover, the water-repellent titanium oxide film 8 formed in the vicinity of the surroundings end of the openings of the ejection orifices 4 had excellent chemical resistance, meniscus was more likely to be formed at the ejection orifices due to the water repellency, and it was possible to stabilize the liquid ejection properties (improve image quality).

Example 2

Figure 5:
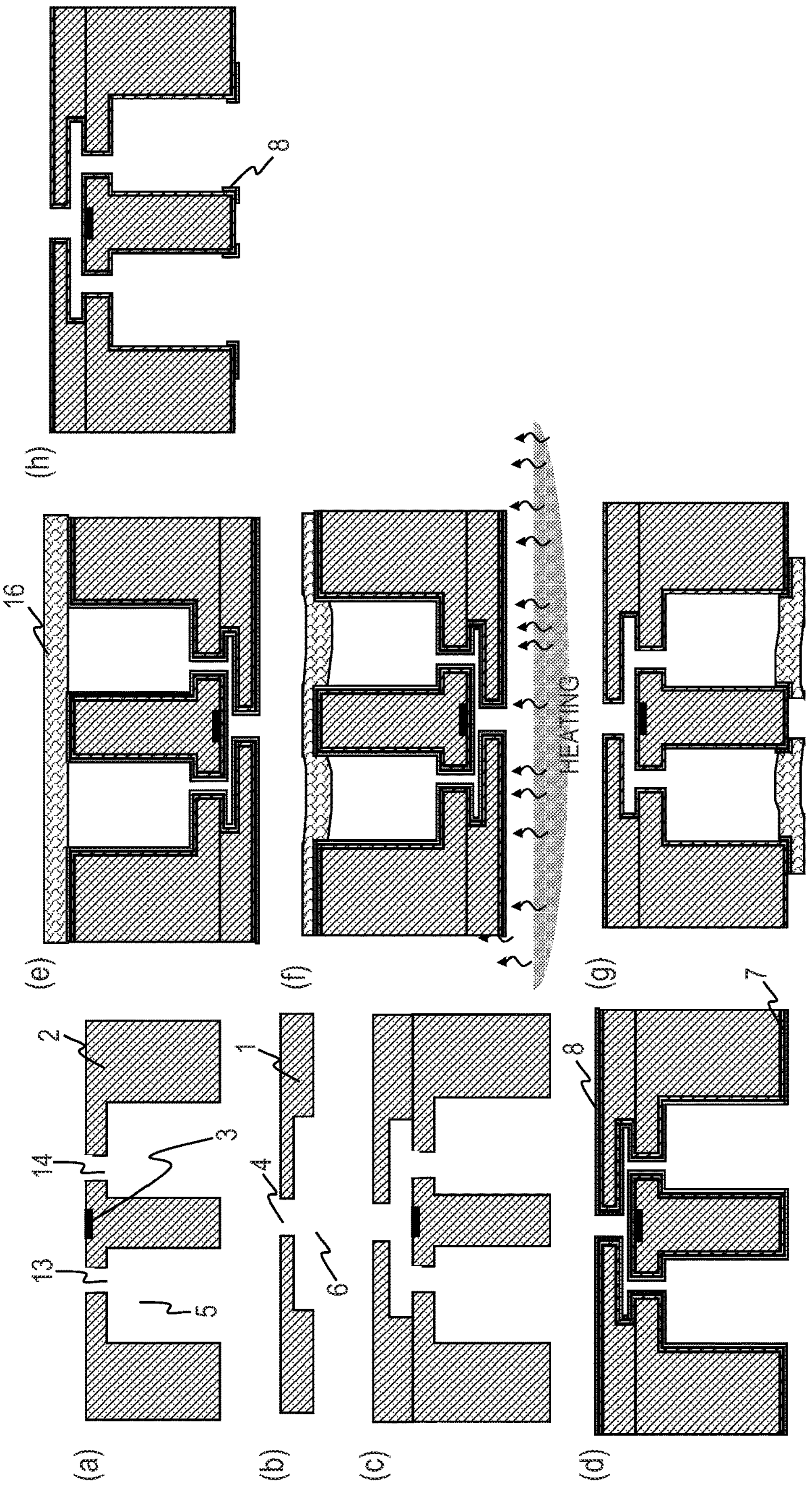
FIG. 5 is an overview process sectional view for describing an example of a method for manufacturing the liquid ejection head according to Embodiment 2 of the present disclosure.

The liquid ejection head according to Embodiment 2 will be described using drawings on the basis of an example. FIG. 5 is an overview process sectional view for describing a manufacturing method in the example.

The processes illustrated in (a) to (d) of FIG. 5 were carried out similarly to the processes illustrated in (a) to (d) of FIG. 4 in Example 1.

Next, the resin mask layer 16 was formed to cover the openings of the liquid introduction flow paths 5 (to cross over the openings in the sectional view) on the back surface of the flow path forming substrate 2 as illustrated in (e) of FIG. 5.

Next, heating was performed at 140° C. for 7 minutes using a heater in order to drop a part of the resin mask layer 16 until the part came into contact with the inner walls of the liquid introduction flow paths 5 as illustrated in (f) of FIG. 5.

Thereafter, the resin mask layer 16 was patterned similarly to the method performed in Example 1. Then, the water-repellent titanium oxide film 8 in the present example was etched similarly to the etching method for the water-repellent titanium oxide film 8 performed in Example 1 other than that a different resin mask layer 16 was used as illustrated in (g) of FIG. 5. Thereafter, the resin mask layer 16 was removed, thereby obtaining a pattern for the water-repellent titanium oxide film 8 (a water-repellent titanium oxide film pattern covering the vicinity of the opening ends to surround the openings of the liquid introduction flow paths 5 on the liquid introduction side and further covering the vicinity of the opening end in the flow path from the opening portion) ((h) of FIG. 5).

In the liquid ejection head obtained as described above, the water-repellent titanium oxide film 8 was pattern-formed in the vicinity of the openings of the liquid introduction flow paths 5 on the back surface of the flow path forming substrate 2. In other words, the water-repellent titanium oxide film covered the vicinity of the opening ends to surround the openings of the liquid introduction flow paths 5, further covered the opening ends toward the inside of the flow path, and covered the vicinity of the opening ends in the flow path. In this manner, the vicinity of the opening ends in the liquid introduction flow paths 5 was brought into a state in which it exhibited water repellency. It was possible to curb entrance of an adhesion into the liquid introduction flow paths 5 when the chip bonding plate was caused to adhere, by the vicinity of the opening ends in the flow path exhibiting water repellency as described above.

Also, since the inside of the flow path was covered with the hydrophilic titanium oxide film 7 similarly to Example 1, it was possible to curb occurrence of bubble pools generated when the liquid flowed into the flow path. Moreover, since the surface of the substrate in the flow path configuring the flow path was protected by the titanium oxide films, a structure with excellent chemical resistance and water resistance was achieved.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A liquid ejection head comprising:

an ejection orifice forming member having an ejection orifice for ejecting a liquid;

a substrate joined to the ejection orifice forming member;

a pressure chamber where pressure for ejecting the liquid from the ejection orifice acts on the liquid;

a first protective film formed continuously from a surface of the ejection orifice forming member to an inner wall surface of the pressure chamber through an inner wall surface of the ejection orifice; and a second protective film formed at least partially on the first protective film, wherein the first protective film is formed on the substrate overlapping the ejection orifice as viewed from a lamination direction of the ejection orifice forming member and the substrate, and wherein a pure water contact angle of the first protective film is smaller than a pure water contact angle of the second protective film.

2. The liquid ejection head according to claim 1, wherein the ejection orifice forming member and the substrate are directly bonded.

3. The liquid ejection head according to claim 1, wherein the first protective film is formed on the surface of the ejection orifice forming member where the ejection orifice is formed.

4. The liquid ejection head according to claim 1, wherein a thickness of the first protective film is 30 nm or more.

5. The liquid ejection head according to claim 1, wherein a thickness of the second protective film is 30 nm or more.

6. The liquid ejection head according to claim 1, wherein a combined thickness of the first protective film and the second protective film is 60 nm to 300 nm.

7. The liquid ejection head according to claim 1, further comprising first and second individual communication holes connecting to the pressure chamber.

8. The liquid ejection head according to claim 1, further comprising:

a first common flow path communicating with the pressure chamber through a first individual communication hole; and a second common flow path communicating with the pressure chamber through a second individual communication hole.

9. The liquid ejection head according to claim 7, wherein the first protective film is formed on an inner wall of the first individual communication hole or an inner wall of the second individual communication hole.

10. The liquid ejection head according to claim 8, wherein the first protective film is formed on an inner wall of the first common flow path or an inner wall of the second common flow path.

11. The liquid ejection head according to claim 1, wherein the second protective film is formed on the first protective film formed on the surface of the ejection orifice forming member.

12. The liquid ejection head according to claim 10, wherein the second protective film is formed on the first protective film formed on the inner wall of the first common flow path or the inner wall of the second common flow path.

13. The liquid ejection head according to claim 8, further comprising a junction substrate with a liquid flow path communicating with the first common flow path or the second common flow path, wherein the substrate and the junction substrate are directly connected, and the first protective film is formed on a junction surface where the substrate and the junction substrate are joined.

14. The liquid ejection head according to claim 13, wherein the second protective film is formed on the first protective film formed on the junction surface where the substrate and the junction substrate are joined.

15. The liquid ejection head according to claim 1, wherein the first protective film contains titanium oxide.

16. The liquid ejection head according to claim 1, wherein the second protective film contains titanium oxide.

17. The liquid ejection head according to claim 1, wherein the pure water contact angle of the first protective film is 40° or less.

18. The liquid ejection head according to claim 1, wherein the pure water contact angle of the second protective film is 70° or more.

19. The liquid ejection head according to claim 4, wherein the pure water contact angle of the second protective film is 70° or more.

20. The liquid ejection head according to claim 1, wherein the pure water contact angle of the first protective film is 35° or less, and the pure water contact angle of the second protective film is 75° or more.

* * * * *